United States Patent [19]
Kato et al.

[11] 3,919,120
[45] Nov. 11, 1975

[54] CATALYST COMPOSITION AND A METHOD FOR PRODUCTION THEREOF

[75] Inventors: Masayoshi Kato, Hoya; Yoshiyuki Eto, Yokosuka; Tadashi Ikemi, Yokohama; Chinami Matsumoto, Yokosuka, all of Japan

[73] Assignee: Nissan Motor Company Limited, Yokohama, Japan

[22] Filed: Dec. 19, 1972

[21] Appl. No.: 316,546

[30] Foreign Application Priority Data
Jan. 18, 1972 Japan............... 47-7365

[52] U.S. Cl. ....... 252/466 B; 252/464; 252/466 PT; 252/466 J; 252/472; 252/473; 252/477 R; 423/213.2; 423/213.5

[51] Int. Cl.² ............... B01J 23/44; B01J 23/74

[58] Field of Search ......... 252/466 B, 464, 466 PT, 252/466 J, 472, 455 R, 473; 423/213.2, 213.5

[56] References Cited
UNITED STATES PATENTS

| | | | |
|---|---|---|---|
| 2,927,088 | 3/1960 | Michalko et al. | 252/466 B |
| 3,271,325 | 9/1966 | Davies et al. | 252/466 B |
| 3,297,546 | 1/1967 | Peck et al. | 252/455 R |
| 3,297,564 | 1/1967 | Peck et al. | 252/455 R |
| 3,388,074 | 6/1968 | Reitmeier | 252/472 |
| 3,444,251 | 5/1969 | Gardner | 252/466 B |
| 3,491,158 | 1/1970 | Reich | 252/466 B |
| 3,513,109 | 5/1970 | Stiles | 252/466 B |
| 3,591,649 | 7/1971 | Kroll et al. | 252/466 B |
| 3,607,961 | 9/1971 | Kovach | 252/466 B |
| 3,655,747 | 4/1972 | Sennewald et al. | 252/466 PT |
| 3,686,340 | 8/1972 | Patrick et al. | 252/473 |
| 3,752,775 | 8/1973 | Yamaguchi et al. | 252/466 B |
| 3,755,204 | 8/1973 | Sergeys | 252/466 PT |
| 3,767,764 | 10/1973 | Dolbear | 423/213.5 |

FOREIGN PATENTS OR APPLICATIONS 1,134,111  11/1968  United Kingdom

*Primary Examiner*—Arthur P. Demers

[57] ABSTRACT

A catalyst composition of oxides of palladium and nickel carried on a carrier of a monolithic or a non-monolithic structure and which may further comprise one or more of the oxides of barium, magnesium, strontium, zirconium, bismuth, vanadium and aluminium. The metal oxides are formed from the corresponding metal salts or metal hydroxides by sintering.

4 Claims, 1 Drawing Figure

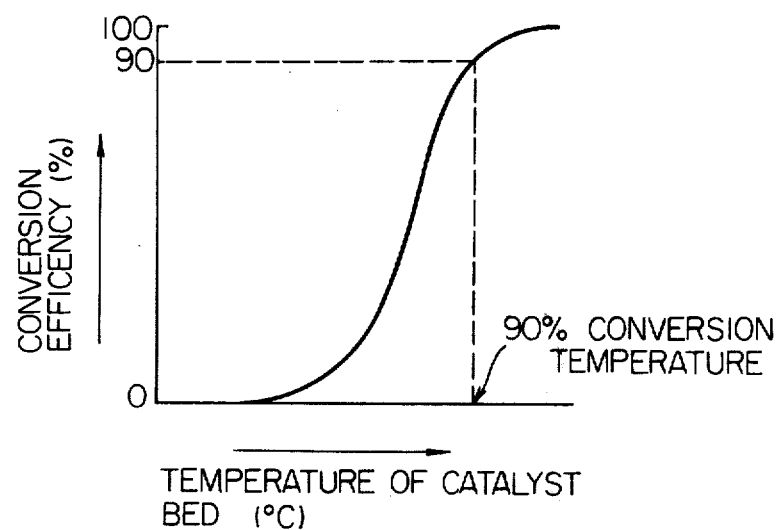

CATALYST COMPOSITION AND A METHOD FOR PRODUCTION THEREOF

This invention relates to a catalyst composition for treatment of exhaust gases emanating from various industrial plants and automotive internal combustion engines, and also to a method for the preparation of the catalyst composition.

The exhaust gases from industrial power plants and automotive internal combustion engines usually contain hydrocarbons and carbon monoxide resulting from partial or incomplete combustion of fuels, and nitrogen oxides produced by the reaction between oxygen and nitrogen gases in the air used for the combustion of fuels at elevated temperatures. This imposes a serious problem of air pollution. From a viewpoint of preventing the air pollution caused by the emission of these toxic compounds, it is strongly desired to render the exhaust gases harmless by oxidizing carbon monoxide and hydrocarbons in the exhaust gases and by reducing or decomposing the nitrogen oxides before the exhaust gases are released into the open air. The abovementioned oxidation and reduction reactions can be accomplished by using a catalyst, for example, in a manner as expressed by the following formulae:

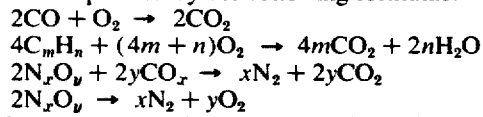

where $m$, $n$, $x$ and $y$ are, respectively, integers which are determined appropriately.

A catalyst used to accomplish these purposes, particularly in internal combustion engines of motor vehicles, should meet the following requirements:

1. Prolonged active life showing optimum reactivity for oxidation and reduction of the toxic compounds over an as long a period of time as possible.
2. Low-temperature activity, viz., capability of being active at relatively low temperatures.
3. Satisfactory conversion efficiency for oxidizing combustible compounds and reducing nitrogen oxides contained in the exhaust gases within a temperature range from about 100° to 900°C.
4. Sufficient mechanical strength, in particular resistance to attrition and to mechanical shocks and vibrations while in operation.
5. Minimized resistance to the flow of exhaust gases through the catalyst.

Of these, the requirements (2), (4) and (5) will not be satisfactorily met by conventional catalysts in the form of pellets or tablets. However, the requirements are all met by a catalyst in the form of a lump or a block having a volume equivalent to from several tenths of a liter to liters and having therein a number of through passages extending in one or two directions. The catalyst of this nature is generally called a "monolithic catalyst" or simply a "block catalyst" and will be herein referred to as such. The structure of a typical monolithic catalyst has a cross-section similar to a honeycomb or a sieve. In contrast to such a monolithic catalyst, the catalyst in the pellet or tablet form will be called herein a "non-monolithic catalyst". The monolithic catalyst is considered suitable for use particularly in cleaning automotive exhaust gases although the non-monolithic catalyst is acceptable for use in the treatment of exhaust gases from industrial power plants and equipments.

The monolithic catalyst can be prepared by any of the following three different methods:

i. A mixture of a catalytic agent and a carrier material is first prepared simply by mixing or by precipitation. The mixture is then moulded into a specific monolithic form and sintered to produce a monolithic catalyst.
ii. A catalytic agent is carried on a previously moulded monolithic carrier structure, for example, by a precipitation method, and then sintered to form a monolithic catalyst.
iii. A previously moulded monolithic carrier structure is impregnated with the catalyst and then the resultant carrier is sintered to give a monolithic catalyst.

The "monolithic carrier" mentioned above is intended to define a carrier having a specific structure such as a block similar to that of the monolithic catalyst defined hereinbefore.

Of the three different methods mentioned above, the methods (i) and (ii) involve various technical problems to be solved and are unacceptable for practical applications. However, the method (iii) is easy to carry out and suitable for use in the production of a monolithic catalyst being sufficiently active and durable.

A variety of catalytic agents are presently available for the purpose of removing air contaminants from the exhaust gases emitted from the automotive internal combustion engines, including (a) a catalytic agent containing copper oxide with or without at least one of the following: manganese oxide, chromium oxide, and magnesia, (b) a catalytic agent containing manganese oxide with chromium and/or iron oxide, (c) a catalytic agent that contains nickel oxide and chromium oxide with or without barium oxide, and (d) a catalytic agent containing palladium together with copper oxide and at least one of the following: chromium oxide and magnesium oxide including magnesia. These catalytic agents, however, are not fully acceptable because the catalytic agent (a) has a disadvantageously short active or durable life by reason of the copper oxide contained therein, though excellent in low-temperature activity, and the catalytic agent (b) is poor in its low-temperature activity when used in gases containing therein a large amount of moisture as in exhaust gases of industrial power plants or automotive internal combustion engines. Moreover, the catalytic agent (c) is also disadvantageously deficient in low-temperature activity and the catalytic agent (d) containing copper oxide therein has a disadvantageously short active life as well.

It is therefore an object of the present invention to provide a novel catalyst composition suitable for treating air-pollutants emanated from various industrial power plants and automotive internal combustion engines.

It is another object of the present invention to provide a novel catalyst composition which is highly efficient in activity at extremely low temperatures and which retains this high efficiency during use over a long period of time.

It is still other object of the present invention to provide a catalyst composition having a high mechanical strength.

It is another object of the present invention to provide a method of preparing the catalyst of the nature mentioned above.

In order to attain the objects advanced, research and development works have been carried out by the present inventors to find a catalyst composition having sufficient durability and activity at low temperatures which are required especially where the catalysts are used in the exhaust systems of motor vehicle internal combustion engines. As a result of efforts in such research and development, it has been found that a catalyst composition containing therein oxides of palladium and nickel shows satisfactory low-temperature activity and sufficient durability when used for removing air-contaminants from exhaust gases of industrial power plants and equipments and of the automotive internal combustion engines. The reasons for the increased low-temperature activity and durability of the catalyst composition mentioned above can not be fully explained at this stage of research and development. However, these are considered to be due to the following reasons. Palladium oxide contained in the above compositions is highly active at low temperatures on carbon monoxide and hydrocarbons and is remarkably durable. The nickel oxides which may occur in various oxide forms are considerably active on hydrocarbons. Moreover, copper oxides are not contained in the catalyst composition, so that the durability of the catalyst as such becomes high.

It has been found through a number of experiments conducted by the present inventors that the catalyst composition is preferred to contain therein from 0.009 to 66.667 mole % of palladium and 99.991 to 33.334 mole % of nickel both in an oxide form. In practical applications, the catalyst composition is carried on a carrier in such a manner that 0.0003–0.1 moles of palladium and 0.05–3.0 moles of nickel both in an oxide form are contained per 1 liter of the carrier. In order to prepare such a catalyst, 0.003–0.1 moles of palladium and 0.05–3.0 moles of nickel should first be impregnated in the form of metal salts into 1 liter of the carrier, followed by sintering the resultant carrier in a stream of hot air to give a catalyst in an oxide form. The term "1 liter of a carrier" used herein means that the block carrier has an outer volume of 1 liter irrespective of the cross section of the carrier in case of a monolithic type, and that the carrier measures 1 liter in case of a non-monolithic type including pellets, tablets and particles.

The concentrations of the metal components of palladium and nickel oxides specified above are determined because of the following reasons. If palladium oxide is carried per 1 liter of a carrier in an amount less than 0.0003 moles as metal, the carrier fails to be active on air-pollutants, particularly carbon monoxide, thus the amount of the metal component palladium oxides should preferably be more than 0.0003 moles per 1 liter of a carrier. However, in practical applications, and mainly for economical reasons, the amount of palladium in oxide form must be less than 0.1 moles per 1 liter of a carrier. Unless, on the other hand, the nickel in the oxide form is carried per 1 liter of a carrier in an amount over 0.05 moles the nickel oxides are little effective on conversion of air-pollutants.

However, if the moles of the metal component the nickel oxide is more than 3.0 per 1 liter of a carrier, then not only the activity of the catalyst decreases presumably because of decreased surface areas of the nickel oxide, but also the nickel oxide powder incompletely carried on the carrier tends to be entrained in the stream of exhaust gases and discharged into the open air, causing heavy metal contamination of the air. Thus, the concentration of the metal component nickel oxide is preferred to be within a range of 0.05–3.0 moles per 1 liter of the carrier.

In order to further improve the activity and durability of the catalyst in accordance with the present invention, extensive studies have been made by adding various types of metal oxides to the catalyst of the nature described above. As a result, the present inventors have found that the low-temperature activity and durability are remarkably improved when one or more of barium, magnesium or strontium oxides are added to the palladium and nickel oxides. Furthermore, when one or more of zirconium, bismuth, vanadium or aluminium oxides are added to the palladium and nickel oxides, the resultant catalyst is found to be remarkably improved in durability and activity. The reason for such improvements in durability and activity by the addition of the above-mentioned compounds as additives is not known at the present stage of study.

The total concentration in moles of at least one of barium, magnesium, strontium, zirconium, bismuth, vanadium, or aluminium in an oxide form should be 1/50–½ of that of nickel. The molar concentration of the metal component or components the above-mentioned compound or compounds may be varied within the range mentioned irrespective of the number and types of the additives selected. If, however, the additives are used in a concentration below the lower limit specified, the intended effects of the additives, i.e., the improvements in durability and activity of the catalyst, would not be achieved. If, on the contrary, the concentration of the additives is higher than the upper limit specified above, the activity of the catalyst would decrease.

Thus, the catalyst composition of the present invention may be composed of palladium and nickel oxides in a ratio defined hereinbefore and at least one of barium, magnesium, strontium, zirconium, bismuth, vanadium, and aluminium oxides in a total metal-component concentration in mole of 1/50–½ of the molar concentration of nickel. Alternatively, the catalyst of the present invention may consist of 1 liter of a carrier, carrying thereon 0.003–0.1 moles of palladium, 0.05–3.0 moles of nickel both in an oxide form and at least one of barium, magnesium, strontium, zirconium, bismuth, vanadium and aluminium oxides in a a total metal-component concentration in mole of 1/50–½ of that of nickel.

The carrier feasible for the catalyst according to the present invention may be of any material including alumina, silica-magnesia and clay treated with an acid. The carrier may be of the previously defined monolithic or of the non-monolithic type. The monolithic type carrier may be formed from a material containing alumina such as cordierite, beta-spodumene or alpha-alumina. Where, on the other hand, the non-monolithic type of the carrier such as in the form of pellets or tablets is preferred, the same may be formed from a material containing alumina such as alpha-alumina, gamma-alumina, delta-alumina or chi-alumina. If desired, the monolithic carrier formed of cordierite, beta-spodumene or alpha-alumina as above mentioned may be improved by depositing an activated alumina such as gamma-alumina or kappa-alumina on the surface of the base material. The carrier of this particular type will be hereinafter refered to as an "alumina-coated monolithic carrier" or simply as a "coated carrier" for convenience of explanation. The methods of preparing the catalyst of the present invention will be described hereinafter. One of the methods comprises the steps of: forming a carrier in a suitable form; immersing the carrier in a solution of metal salts of palladium and nickel in such a manner that 0.0003–0.1 moles of palladium and 0.05–3.0 moles of nickel are carried both in an oxide form per 1 liter of the carrier; and sintering the resultant carrier at a temperature of 600°–900°C. The palladium salt may be palladium nitrate, palladium bromide, palladium chloride or palladium sulfate, and the nickel salt may be nickel nitrate, nickel acetate, nickel chloride or ammonium nickel chloride. In this connection, at least one of barium, magnesium, strontium, zirconium, bismuth or vanadium salts may be added to the solution. In this case, barium nitrate, barium nitrite, barium acetate, barium formate, barium chloride, barium bromide or barium iodide may be used as a barium salt; magnesium nitrate, magnesium acetate, mangesium chloride, magnesium bromide or magnesium iodide as a magnesium sakt; strontium nitrate, strontium chloride, strontium bromide, or strontium iodide as a strontium salt; zirconyl nitrate, zirconium nitrate, zirconium chloride, or zirconium iodide as a zirconium salt; bismuth nitrate, bismuth oxide, bismuth chloride, or bismuth bromide as a bismuth salt; vanadium oxide, vanadium chloride or vanadium bromide as a vanadium salt; and aluminium nitrate, aluminium acetate, aluminium chloride, aluminium bromide or aluminium iodide as an aluminium salt.

The catalyst of the present invention can also be prepared by first mixing nickel hydroxide powder and palladium hydroxide powder prepared by a precipitation method, and powder of activated alumina or alumina sol; moulding the resultant mixture into a suitable form; and sintering the mould to give a catalyst. At least one of barium, magnesium, strontium, zirconium, bismuth or vanadium hydroxides may be added at the mixing step to improve the properties of the catalyst, particularly durability and activity. Another method of preparing the catalyst of the present invention comprises the steps of: mixing nickel hydroxide powder, activated alumina and alumina; moulding the mixture into a suitable form; immersing the mould into a solution of a palladium salt; and drying and sintering the resultant mould at a temperature of 600° to 900°C. It should be noted that any one of the palladium salts mentioned above may be used in this method. Furthermore, at least one of barium, magnesium, strontium, zirconium, bismuth or vanadium hydroxides may also be added at the mixing step for the same reason as described above.

A more detailed nature of the catalyst according to the present invention and various advantages of the catalyst over the prior art counterparts will be more exactly understood from the following examples of the invention and through comparison between these examples and twelve comparative examples, Comparative Examples 1 to 7 being directed to prior art catalytic compositions and specimens obtained from Comparative Examples 8 to 12 having the same components as in the present invention but not falling within a range of this invention. The only FIGURE of the accompanying drawing illustrates a plot indicating the relationship between the conversion efficiency (to be defined later) of carbon monoxide, propane and/or nitrogen monoxide and the temperature of a catalyst bed used.

EXAMPLE 1

A 0.785 liter cordierite block carrier was dipped in 3.0 liters of an aqueous palladium nitrate and nickel nitrate solution wherein the concentration of palladium ions was 0.1 moles and that of nickel ions 2.5 moles per liter. The dipped carrier was then dried at 120°C for 15 hours and sintered in an airstream at 800°C for 4 hours. The thus obtained block catalyst contained 0.02 moles of palladium and 0.50 moles of nickel, when calculated as metals, both as oxides.

EXAMPLE 2

Example 1 was repeated except that a 0.785 liter beta-spondumene block carrier was immersed in 3.0 liters of an aqueous solution of palladium nitrate and nickel nitrate wherein the concentration of palladium ions was 0.13 moles and that of nickel ions 0.64 moles per 1 liter of the solution.

The thus obtained block catalyst contained metal oxides in which 0.02 moles of palladium and 0.10 moles of nickel were present when calculated as metals.

EXAMPLE 3

A block of a 0.785 liter cordierite monolithic carrier was immersed in a commercially available alumina sol. Then, the immersed carrier was removed and sintered at 700°C for 3 hours to deposit gammaalumina thereon. The same process was repeated two times so that a total of 21% by weight of gamma-alumina was finally coated on the monolithic carrier. The alumina-coated monolithic carrier thus obtained was immersed in 3.0 liters of an aqueous palladium nitrate and nickel nitrate solution wherein the concentrations of palladium ions and of nickel ions were 0.018 moles and 0.18 moles, respectively, per liter of the solution. The thus treated carrier was removed from the solution, dried at 120°C for 15 hours and sintered in a stream of air at 750°C for 6 hours. The resultant aluminacoated monolithic catalyst contained metal oxides in which 0.005 moles of palladium and 0.05 moles of nickel were present in the block when calculated as metals.

EXAMPLE 4 (as proposed by HHL)

A 0.785 liter beta-spodumene block carrier was coated with about 23% of gamma-alumina in the same manner as in Example 3. The coated carrier was immersed in 3.0 liters of an aqueous palladium nitrate and nickel nitrate solution wherein the concentration of palladium ions was 0.21 moles and that of nickel ions 1.30 moles per liter. Then the treatment described under Example 3 was repeated. The resulting block catalyst contained 0.005 moles of palladium and 0.30 moles of nickel when calculated as metals, both as oxides.

EXAMPLE 5

1 liter of a commercially available activated alumina carrier (extrusion moulded product made of delta-alumina and having a diameter of 3 mm) was immersed in 1.20 liters of an aqueous palladium nitrate and nickel nitrate solution wherein the concentrations of palladium ions and of nickel ions were 0.013 moles and 0.044 moles, respectively, per 1 liter of the solution. The thus treated carrier was removed from the solution, dried at 120°C for 15 hours and sintered in a stream of air at 750°C for 5 hours. The resultant catalyst contained therein metal oxides in which 0.005 moles of palladium and 0.02 moles of nickel were present, when calculated as metals, in 1 liter of the catalyst.

EXAMPLE 6

Example 5 was repeated except that 1 liter of commercially available activated gamma-alumina carrier of an about 6–8 mesh per inch was immersed in 7.35 liters of an aqueous palladium nitrate and nickel nitrate solution wherein the concentrations of palladium ions and of nickel ions were 0.033 moles and 2.20 moles, respectively, per liter of the solution. The resultant catalyst contained metal oxides in which 0.015 moles of palladium and 1.0 mole of nickel were present, when calculated as metals, in 1 liter of the catalyst.

EXAMPLE 7

Example 5 was repeated except that 1 liter of a commercially available activated chi-alumina carrier of an about 6–8 mesh per inch was immersed in 1.50 liters of an aqueous palladium nitrate and nickel nitrate solution wherein the concentrations of palladium ions and of nickel ions were 0.020 moles and 1.20 moles, respectively, per liter of the solution. The resultant catalyst contained therein metal oxides in which 0.010 moles of palladium and 0.60 moles of nickel were present, when calculated as metals, in 1 liter of the catalyst.

EXAMPLE 8

1.5 moles of dried powder of alkali-free nickel hydroxide prepared by a precipitation method and 0.015 moles of palladium hydroxide in dried powder form were placed into a mortar and mixed. To the mixture were added 1 liter of an activated alumina powder (200–250 mesh per inch) and 0.5 liters of an alumina sol containing 10% by weight of alumina, and water was further added to the mixture to give a suitable consistency thereto. Then, the resultant mixture was moulded in a compression type tableting machine into 3 × 3 mm tablets. The thus obtained tablets were dried at 120°C for 15 hours and then sintered in a stream of air at 700°C for 8 hours to give a tableted catalyst having catalytic components composed of oxides of nickel and palladium.

EXAMPLE 9

0.3 moles of dried powder of alkali-free nickel hydroxide prepared by a precipitation method and 1 liter of activated alumina powder (200–250 mesh per inch) were thoroughly mixed in a mortar. To the mixture 0.5 liters of alumina sol containing 10% by weight of alumina were added, and water was further added to the mixture to give a suitable consistency thereto. Then, the resultant mixture was moulded in a compression type tableting machine into tablets measuring 3 × 3 mm. The thus obtained tablets were dried at 120°C for 15 hours, and were then immersed in 1 liter of an aqueous solution containing 0.02 moles of palladium nitrate. The resultant tablets were removed from the solution, dried at 120°C for 15 hours and sintered in a stream of air at 700°C for 8 hours to give a tableted catalyst composed of oxides of nickel and palladium.

EXAMPLE 10

Example 1 was repeated except that a block of a similar monolithic carrier to that used in Example 1 was immersed in 3.0 liters of an aqueous solution of palladium nitrate, nickel nitrate and barium nitrate wherein the concentrations of palladium ions, nickel ions and barium ions were 0.077 moles, 0.50 moles and 0.10 moles, respectively, per liter of the solution. The resultant monolithic catalyst contained metal oxides in which 0.015 moles of palladium, 0.10 moles of nickel and 0.02 moles of barium were present, when calculated as metals, in 1 liter of the catalyst.

EXAMPLE 11

Example 3 was repeated except that a block of a similar alumina-coated monolithic carrier to that used in Example 4 was immersed in 3.0 liters of an aqueous solution of a mixture of palladium nitrate, nickel nitrate and barium nitrate wherein the concentrations of palladium ions, nickel ions and barium ions were 0.021 moles, 0.64 moles and 0.043 moles per 1 liter of the solution, respectively.

The resultant alumina-coated monolithic catalyst contained therein metal oxides in which 0.005 moles of palladium, 0.15 moles of nickel and 0.01 moles of barium were present in the block when calculated as metals.

EXAMPLE 12

Example 5 was repeated except that 1 liter of a similar carrier to that used in Example 6 was immersed in 1.35 liters of an aqueous palladium nitrate, nickel nitrate and barium nitrate solution wherein the concentrations of palladium ions, nickel ions and barium ions were 0.22 moles, 1.10 moles and 0.22 moles, respectively, per liter of the solution. The resultant catalyst contained metal oxides in which 0.01 moles of palladium 0.50 moles of nickel and 0.10 moles of barium were present, when calculated as metals, in 1 liter of the catalyst.

EXAMPLE 13

Example 3 was repeated except that a block of a similar alumina-coated monolithic carrier to that used in Example 3 was immersed in 3.0 liters of an aqueous palladium nitrate, nickel nitrate and magnesium nitrate solution wherein the concentrations of palladium ions, nickel ions and magnesium ions were 0.018 moles, 0.29 moles and 0.0036 moles, respectively, in 1 liter of the solution.

The resultant alumina-coated monolithic catalyst contained metal oxides in which 0.005 moles of palladium, 0.08 moles of nickel and 0.001 moles of magnesium were present in the block when calculated as metals.

EXAMPLE 14

Example 5 was repeated except that 1 liter of a similar carrier to that used in Example 7 was immersed in 1.50 liters of an aqueous palladium nitrate, nickel nitrate and magnesium nitrate solution in which the concentrations of palladium ions, nickel ions and magnesium ions were 0.020 moles, 2.0 moles and 0.20 moles, respectively, per liter of the solution.

The resultant catalyst contained metal oxides wherein 0.010 moles of palladium, 1.0 mole of nickel and 0.10 moles of magnesium were present, when calculated as metals, in 1 liter of the catalyst.

EXAMPLE 15

Example 1 was repeated except that a block of a similar monolithic carrier to that used in Example 2 was immersed in 3.0 liters of an aqueous palladium nitrate, nickel nitrate and strontium nitrate solution in which the concentrations of palladium ions, nickel ions and strontium ions were 0.096 moles, 1.30 moles and 0.064 moles, respectively, per liter of the solution.

The resultant monolithic catalyst contained in the block 0.015 moles of palladium, 0.20 moles of pickel and 0.01 moles of strontium, when calculated as metals, all in an oxide form.

EXAMPLE 16

Example 3 was repeated except that a block of a similar alumina-coated monolithic carrier to that used in Example 3 was immersed in 3.0 liters of an aqueous solution of a mixture of palladium nitrate, nickel nitrate, and strontium nitrate in which 0.018 moles of palladium ions, 2.9 moles of nickel ions and 0.11 moles of strontium ions were contained in 1 liter of the solution.

The resultant monolithic catalyst contained in the block 0.005 moles of palladium, 0.80 moles of nickel and 0.03 moles of strontium, when calculated as metals, all in an oxide form.

EXAMPLE 17

Example 1 was repeated except that a block of a similar monolithic carrier to that used in Example 2 was immersed in 3.0 liters of an aqueous palladium nitrate, nickel nitrate, barium nitrate and magnesium nitrate solution in which the concentrations of palladium ions, nickel ions, barium ions and magnesium ions were 0.13 moles, 1.30 moles, 0.13 moles and 0.13 moles, respectively, per liter of the solution.

The resultant monolithic catalyst contained in the block in an oxide form 0.020 moles of palladium, 0.20 moles of nickel, 0.020 moles of barium and 0.020 moles of magnesium when calculated as metals.

EXAMPLE 18

Example 3 was repeated except that a block of a similar alumina-coated monolithic carrier to that used in Example 3 was immersed in 3.0 liters of an aqueous palladium nitrate, nickel nitrate, barium nitrate and strontium nitrate solution in which the concentrations of palladium ions, nickel ions, barium ions and strontium ions were 0.029 moles, 0.55 moles, 0.18 moles and 0.0036 moles, respectively, per liter of the solution.

The resultant monolithic catalyst contained metal oxides wherein 0.008 moles of palladium, 0.15 moles of nickel, 0.05 moles of barium and 0.001 moles of strontium were present in the block when calculated as metals.

EXAMPLE 19

Example 5 was repeated except that 1 liter of a similar carrier to that used in Example 6 was immersed in 1.35 liters of an aqueous palladium nitrate, nickel nitrate, magnesium nitrate and strontium nitrate solution in which the concentrations of palladium ions, nickel ions, magnesium ions and strontium ions were 0.022 moles, 1.10 moles, 0.022 moles and 0.022 moles, respectively, per liter of the solution.

1 liter of the resultant catalyst contained in an oxide form 0.010 moles palladium, 0.50 moles of nickel, 0.10 moles of magnesium and 0.01 moles of strontium when calculated as metals.

EXAMPLE 20

1.50 moles of alkali-free nickel hydroxide and 0.12 moles of alkali-free barium hydroxide, both of which were in the form of dried powder prepared by a precipitation method, and 1 liter of activated alumina powder (200–250 mesh per inch) were mixed together in a mortar. To the mixture were added 0.5 liters of alumina sol containing 10% by weight of alumina, and water was further added to the above mixture to give a suitable consistency thereto. Then, the resultant mixture was moulded in a compression type tableting machine into 3 × 3 mm tablets. The tablets thus obtained were dried at 120°C for 15 hours and then immersed in an aqueous solution containing 0.02 moles of palladium nitrate. The immersed tablets were removed from the solution, dried at 120°C for 15 hours and sintered in a stream of air at 700°C for 8 hours to give a tableted catalyst having the catalytic components composed of oxides of nickel, barium and palladium.

EXAMPLE 21

0.30 moles of alkali-free nickel hydroxide and 0.005 moles of alkali-free magnesium hydroxide, both of which were prepared by a precipitation method and were in the form of dried powder, and 0.010 moles of palladium hydroxide were mixed together in a mortar. To the mixture were added 1 liter of powder of an activated alumina (200–250 mesh per inch) and 0.5 liters of an alumina sol containing 10% by weight of an alumina, and further water was introduced in the mixture to give it a suitable consistency. The resultant mixture was moulded in a compression type tableting machine into tablets measuring 3 × 3 mm. The thus obtained tablets were dried at 120°C for 15 hours and sintered in a stream of air at 700°C for 8 hours to obtain a tableted catalyst having catalytic components composed of oxides of nickel, magnesium, and palladium.

EXAMPLE 22

Alkali-free hydroxides in the form of dried powder prepared by a precipitation method, viz., 0.50 moles of nickel hydroxide, 0.04 moles of strontium hydroxide and 0.010 moles of palladium hydroxide were completely mixed together in a mortar. 1 liter of powder of an activated alumina (200–250 mesh per inch) and 0.5 liters of an alumina sol containing 10% by weight of an alumina were added to the mixture, and then water was further added to the mixture to give a suitable consistency thereto. Thereafter, the resultant mixture was moulded in a compression type tableting machine into tablets. The thus obtained tablets were dried at 120°C for 15 hours, and sintered in a stream of air at 700°C for 8 hours to give a tableted catalyst having catalytic components composed of oxides of nickel, strontium, and palladium.

EXAMPLE 23

Alkali-free hydroxides in the form of dried powder prepared by a precipitation method, viz., 0.20 moles of nickel hydroxide, 0.01 moles of barium hydroxide and 0.01 moles of magnesium hydroxide, and 1 liter of powder of activated alumina of about 200–250 mesh per inch were mixed well in a mortar. 0.5 liters of alumina sol containing 10% by weight of alumina were added to the mixture, water being further added to the mixture to give a suitable consistency thereto. Then, the resultant mixture was moulded in a compression type tableting machine into tablets. The thus obtained tablets were dried at 120°C for 15 hours and were immersed in 1 liter of an aqueous solution containing 0.02 moles of palladium nitrate. The resultant tablets were removed from the solution, dried at 120°C for 15 hours and sintered in a stream of air at 700°C for 8 hours to yield a tableted catalyst having catalytic components composed of oxides of nickel, barium, magnesium, and palladium.

EXAMPLE 24

Alkali-free hydroxides in the form of dried powder prepared by a precipitation method, viz., 0.80 moles of nickel hydroxide, 0.04 moles of barium hydroxide, 0.02 moles of strontium hydroxide and 0.015 moles of palladium hydroxide were mixed well in a mortar. 1 liter of powder of activated alumina of 200–250 mesh per inch and 0.05 liters of alumina sol containing 10% by weight of alumina were added to the mixture and water was further added to the mixture to give a suitable consistency thereto. The resultant mixture was moulded in a compression type tableting machine into 3 × 3 mm tablets. The thus obtained tablets were dried at 120°C for 15 hours and sintered in a stream of air at 700°C for 8 hours to yield a tableted catalyst having catalytic components composed of oxides of nickel, barium, strontium and palladium.

EXAMPLE 25

Example 1 was repeated except that a block of a similar monolithic carrier to that used in Example 1 was immersed in 3.0 liters of an aqueous palladium nitrate, nickel nitrate and zirconium nitrate solution in which the concentrations of palladium ions, nickel ions and zirconium ions were 0.077 moles, 1.00 mole and 0.15 moles, respectively, per liter of the solution.

The resultant monolithic carrier contained metal oxides in which 0.015 moles of palladium, 0.20 moles of nickel and 0.03 moles of zirconium were present, when calculated as metals, in the block.

EXAMPLE 26

Example 3 was repeated except that a block of a similar alumina-coated carrier to that used in Example 3 was immersed in 3.0 liters of an aqueous palladium nitrate, nickel nitrate and zirconyl nitrate solution wherein the concentrations of palladium ions, nickel ions and zirconium ions were 0.036 moles, 1.80 moles and 0.26 moles, respectively, per liter of the solution.

The resultant alumina-deposited monolithic catalyst contained in the block 0.010 moles of palladium, 0.50 moles of nickel and 0.07 moles of zirconium, when calculated as metals, all in the form of oxides.

EXAMPLE 27

Example 5 was repeated except that 1 liter of a similar carrier to that used in Example 5 was immersed in an aqueous palladium nitrate, nickel nitrate and bismush nitrate solution in which the concentrations of palladium ions, nickel ions and bismuth ions were 0.022 moles, 0.44 moles and 0.022 moles, respectively, per 1 liter of the solution.

The resultant catalyst contained in the form of oxides 0.010 moles of palladium, 0.20 moles of nickel and 0.01 moles of bismuth, when calculated as metals, in 1 liter of the catalyst.

EXAMPLE 28

Example 1 was repeated except that a block of a similar monolithic carrier to that used in Example 2 was immersed in 3.0 liters of an aqueous palladium nitrate, nickel nitrate and vanadium trioxide solution in which the concentrations of palladium ions, nickel ions and vanadium ions were 0.064 moles, 2.2 moles and 0.064 moles, respectively, per liter of the solution.

The resultant monolithic carrier contained in the block in the form of oxides 0.01 moles of palladium, 0.35 moles of nickel and 0.01 moles of vanadium when calculated as metals.

EXAMPLE 29

Example 5 was repeated except that a block of a similar alumina-coated monolithic catalyst to that used in Example 4 was immersed in 3.0 liters of an aqueous palladium nitrate, nickel nitrate and aluminium nitrate solution in which the concentrations of palladium ions, nickel ions and aluminium ions were 0.064 moles, 1.30 moles and 0.32 moles, respectively, per 1 liter of the solution.

The resultant monolithic catalyst contained in the block 0.015 moles of palladium, 0.30 moles of nickel and 0.05 moles of aluminium, when calculated as metals, all in the form of oxides.

EXAMPLE 30

Example 5 was repeated except that 1 liter of a similar carrier to that used in Example 6 was immersed in 3.0 liters of an aqueous palladium nitrate, nickel nitrate and aluminium nitrate solution in which the concentrations of palladium ions, nickel ions and aluminium ions were 0.022 moles, 1.60 moles and 0.22 moles, respectively, per 1 liter of the solution.

The resultant catalyst contained metal oxides in which 0.010 moles of palladium, 0.70 moles of nickel and 0.10 moles of aluminium were present, when calculated as metals, in 1 liter of the catalyst.

EXAMPLE 31

Example 3 was repeated except that a block of a similar alumina-coated monolithic carrier to that used in Example 3 was immersed in 3.0 liters of an aqueous palladium nitrate, nickel nitrate, zirconyl nitrate and bismuth nitrate solution in which the concentrations of palladium ions, nickel ions, zirconium ions and bismuth ions were 0.036 moles, 1.50 moles, 0.18 moles and 0.036 moles per liter of the solution.

The resultant alumina-coated monolithic catalyst contained in the block 0.010 moles of palladium, 0.40 moles of nickel, 0.05 moles of zirconium and 0.01 moles of bismuth, when calculated as metals, all in the form of oxides.

EXAMPLE 32

Example 3 was repeated except that a block of a similar alumina-coated monolithic carrier to that used in Example 4 was immersed in 3.0 liters of an aqueous palladium nitrate, nickel nitrate, zirconyl nitrate and aluminium nitrate solution in which the concentrations of palladium ions, nickel ions, zirconium ions and aluminium ions were 0.042 moles, 2.1 moles, 0.042 moles and 0.21 moles per liter of the solution.

The resultant alumina-coated monolithic catalyst contained in the block 0.010 moles of palladium, 0.50 moles of nickel, 0.01 moles of zirconium and 0.05 moles of aluminium, when calculated as metals, all in the form of oxides.

EXAMPLE 33

Example 1 was repeated except that a block of a similar monolithic carrier to that used in Example 1 was immersed in 3.0 liters of an aqueous palladium nitrate, nickel nitrate, bismuth nitrate and vanadium trioxide solution in which the concentrations of palladium ions, nickel ions, bismuth ions and vanadium ions were 0.051 moles, 1.50 moles, 0.10 moles and 0.10 moles, respectively, per 1 liter of the solution.

The resultant monolithic catalyst contained in the block 0.010 moles of palladium 0.30 moles of nickel, 0.02 moles of bismuth and 0.02 moles of vanadium, when calculated as metals, all in the form of oxides.

EXAMPLE 34

Akali-free hydroxides in the form of dried powder prepared by a precipitation method, viz., 1.20 moles of nickel hydroxide and 0.08 moles of zirconium hydroxide, and 1 liter of powder of activated alumina of about 200–250 mesh per inch were mixed in a mortar. 0.5 liters of alumina sol containing 10% by weight of alumina was added to the mixture and water was further added to the mixture to give a suitable consistency thereto. The resultant mixture was moulded in a compression type tableting machine into 3 × 3 mm tablets. The thus obtained tablets were dried at 120°C for 15 hours and were then immersed in 1 liter of an aqueous solution containing 0.02 moles of palladium nitrate. The resultant tablets were removed from the solution, dried at 120°C for 15 hours and sintered in a stream of air at 700°C for 8 hours to give a tableted catalyst having catalytic components composed of oxides of nickel, zirconium and palladium.

EXAMPLE 35

Alkali-free hydroxides in the form of dried powder prepared by a precipitation method, viz., 0.50 moles of nickel hydroxide, 0.02 moles of vanadium hydroxide and 0.020 moles of palladium hydroxide, were mixed well in a mortar. 1 liter of powder of activated alumina of 200–250 mesh per inch and 0.5 liters of alumina sol containing 10% by weight of alumina were added to the mixture, and water was further added to the mixture to give a suitable consistency thereto. The resultant mixture was moulded in a compression type tableting machine into 3 × 3 mm tablets. The thus obtained tablets were dried at 120°C for 15 hours and sintered in a stream of air at 700°C for 8 hours to obtain a tableted catalyst having catalytic components composed of oxides of nickel, vanadium and palladium.

EXAMPLE 36

Alkali-free hydroxides in the form of dried powder prepared by a precipitation method, viz., 0.30 moles of nickel hydroxide, 0.02 moles of bismuth hydroxide, and 1 liter of powder of activated alumina of about 200–250 mesh were mixed well in a mortar. 0.5 liters of alumina sol containing therein 10% by weight of alumina was added to the mixture and water was further added to the mixture to give a suitable consistency thereto. The resultant mixture was moulded in a compression type tableting machine into 3 × 3 mm tablets. The thus obtained tablets were dried at 120°C for 15 hours and then immersed in 1 liter of an aqueous solution containing 0.015 moles of palladium nitrate. Then, the immersed tablets were removed from the solution, dried at 120°C for 15 hours and sintered in a stream of air at 700°C for 8 hours to yield a tableted catalyst having catalytic components composed of oxides of nickel, bismuth and palladium.

EXAMPLE 37

Alkali-free hydroxides in the form of dried powder prepared by a precipitation method, viz., 0.80 moles of nickel hydroxide, 0.05 moles of zirconium hydroxide, 0.02 moles of bismuth hydroxide and 0.20 moles of palladium hydroxide, were mixed well in a mortar. 1 liter of activated alumina powder of about 200–250 mesh per inch and 0.5 liters of alumina sol containing 10% by weight of alumina were added to the mixture and water was further added to the mixture to give a suitable consistency thereto. Thereafter, the resultant mixture was moulded in a compression type tableting machine into 3 × 3 mm tablets. The thus obtained tablets were dried at 120°C for 15 hours and sintered in a stream of air at 700°C for 8 hours to obtain a tableted catalyst having catalytic components composed of oxides of nickel, zirconium, bismuth and palladium.

EXAMPLE 38

Example 3 was repeated except that a block of a similar alumina-coated monolithic carrier to that used in Example 3 was immersed in 3.0 liters of an aqueous palladium nitrate, nickel nitrate, barium nitrate and zirconyl nitrate solution in which the concentrations of palladium ions, nickel ions, barium ions and zirconium ions were 0.018 moles, 1.80 moles, 0.29 moles and 0.11 moles, respectively, per liter of the solution.

The resultant alumina-coated monolithic carrier contained in the block 0.005 moles of palladium, 0.50 moles of nickel, 0.08 moles of barium and 0.03 moles of zirconium, when calculated as metals, all in the form of oxides.

EXAMPLE 39

Example 3 was repeated except that a block of a similar alumina-coated monolithic carrier to that used in Example 4 was immersed in 3.0 liters of an aqueous palladium nitrate, nickel nitrate, barium nitrate and aluminium nitrate solution in which the concentrations of palladium ions, nickel ions, barium ions and aluminium ions were 0.042 moles, 2.1 moles, 0.08 moles and 0.13 moles, respectively, per 1 liter of the solution.

The resultant alumina-coated monolithic catalyst contained in the block 0.01 moles of palladium, 0.50 moles of nickel, 0.02 moles of barium and 0.03 moles of aluminium, when calculated as metals, all in the form of oxides.

EXAMPLE 40

Example 1 was repeated except that a block of a similar monolithic carrier to that used in Example 1 was immersed in 3.0 liters of an aqueous palladium nitrate, nickel nitrate, magnesium nitrate and bismuth nitrate solution in which the concentrations palladium ions, nickel ions, magnesium ions and bismuth ions were 0.077 moles, 0.77 moles, 0.051 moles and 0.051 moles, respectively, per 1 liter of the solution.

The resultant catalyst contained in the block 0.015 moles of palladium, 0.15 moles of nickel, 0.01 moles of magnesium and 0.01 moles of bismuth, when calculated as metals, all in the form of oxides.

EXAMPLE 41

Example 5 was repeated except that 1 liter of a similar commercially available activated chi-alumina to that used in Example 7 was immersed in 1.50 liters of an aqueous palladium nitrate, nickel nitrate, magnesium nitrate and vanadium trioxide solution in which the concentrations of palladium ions, nickel ions, magnesium ions and vanadium ions were 0.020 moles, 2.4 moles, 0.20 moles and 0.10 moles, respectively, in 1 liter of the solution.

The resultant catalyst contained in the block all in the form of oxides 0.010 moles of palladium, 1.2 moles of nickel, 0.10 moles of magnesium, and 0.05 moles of vanadium, when calculated as metals, in 1 liter of the catalyst.

EXAMPLE 42

Example 3 was repeated except that a block of a similar alumina-coated monolithic carrier to that used in Example 3 was immersed in 3.0 liters of an aqueous palladium nitrate, nickel nitrate, strontium nitrate and zirconyl nitrate solution in which the concentrations of palladium ions, nickel ions, strontium ions and zirconium ions were 0.018 moles, 0.72 moles, 0.072 moles and 0.036 moles, respectively, in 1 liter of the solution.

The resultant monolithic catalyst contained in the block 0.005 moles of palladium, 0.20 moles of nickel, 0.02 moles of strontium and 0.01 moles of zirconium, when calculated as metals, all in the form of oxides.

EXAMPLE 43

Example 1 was repeated except that a block of a similar monolithic carrier to that used in Example 2 was immersed in 3.0 liters of an aqueous palladium nitrate, nickel nitrate, strontium nitrate, and aluminium nitrate solution in which the concentrations of palladium ions, nickel ions, strontium ions and aluminium ions were 0.096 moles, 3.8 moles, 0.38 moles and 0.38 moles, respectively, per liter of the solution.

The resultant monolithic catalyst contained in the block 0.015 moles of palladium, 0.60 moles of nickel, 0.06 moles of strontium and 0.06 moles of aluminium, when calculated as metals, all in the form of oxides.

EXAMPLE 44

Example 3 was repeated except that a block of a similar alumina-coated monolithic carrier to that used in Example 3 was immersed in 3.0 liters of an aqueous palladium nitrate, nickel nitrate, barium nitrate, zirconyl nitrate and aluminium nitrate solution in which the concentrations of palladium ions, nickel ions, barium ions, zirconium ions and aluminium ions were 0.036 moles, 1.80 moles, 0.18 moles, 0.073 moles and 0.18 moles, respectively, per liter of the solution.

The resultant catalyst contained in the block 0.010 moles of palladium, 0.50 moles of nickel, 0.05 moles of barium, 0.02 moles of zirconium and 0.05 moles of aluminium, when calculated as metals, all in the form of oxides.

EXAMPLE 45

Example 3 was repeated except that a block of a similar alumina-coated monolithic carrier to that used in Example 4 was immersed in 3.0 liters of an aqueous palladium nitrate, nickel nitrate, magnesium nitrate, zirconyl nitrate and bismuth nitrate solution in which the concentrations of palladium ions, nickel ions, magnesium ions, zirconium ions and bismuth ions were 0.042 moles, 1.70 moles, 0.21 moles, 0.085 moles and 0.042 moles, respectively, per liter of the solution.

The resultant catalyst contained in the block 0.010 moles of palladium, 0.40 moles of nickel, 0.05 moles of magnesium, 0.02 moles of zirconium and 0.01 moles of bismuth, when calculated as metals, all in the form of oxides.

EXAMPLE 46

Example 1 was repeated except that a block of a similar monolithic carrier to that used in Example 2 was immersed in 3.0 liters of an aqueous palladium nitrate, nickel nitrate, strontium nitrate, bismuth nitrate and vanadium trioxide solution in which the concentrations of palladium ions, nickel ions, strontium ions, bismuth ions and vanadium ions were 0.064 moles, 1.90 moles, 0.13 moles and 0.13 moles, respectively, 1 liter of the solution.

The resultant monolithic catalyst contained in the block 0.010 moles of palladium, 0.30 moles of nickel, 0.02 moles of strontium, 0.02 moles of bismuth and 0.02 moles of vanadium, when calculated as metals, all in the form of oxides.

EXAMPLE 47

Example 3 was repeated except that a block of a similar alumina-coated monolithic carrier to that used in Example 3 was immersed in 3.0 liters of an aqueous palladium nitrate, nickel nitrate, barium nitrate, magnesium nitrate and zirconyl nitrate solution in which the concentrations of palladium ions, nickel ions, barium ions, magnesium ions and zirconium ions were 0.036 moles, 1.50 moles, 0.18 moles, 0.036 moles and 0.073 moles, respectively, per liter of the solution.

The resultant alumina-coated monolithic catalyst contained in the block 0.010 moles of palladium, 0.40 moles of nickel, 0.05 moles of barium, 0.01 moles of magnesium and 0.02 moles of zirconium, when calculated as metals, all in the form of oxides.

EXAMPLE 48

Example 3 was repeated except that a block of a similar alumina-coated monolithic carrier to that used in Example 4 was immersed in 3.0 liters of an aqueous palladium nitrate, nickel nitrate, barium nitrate, strontium nitrate and aluminium nitrate solution in which the concentrations of palladium ions, nickel ions, barium ions, strontium ions and aluminum ions were 0.042 moles, 1.7 moles, 0.13 moles, 0.13 moles and 0.21 moles, respectively, per liter of the solution.

The resultant alumina-coated monolithic catalyst contained in the block 0.010 moles of palladium, 0.40 moles of nickel, 0.03 moles of barium, 0.03 moles of strontium and 0.05 moles of aluminum, when calculated as metals, all in the form of oxides.

EXAMPLE 49

Example 3 was repeated except that a block of a similar alumina-coated monolithic carrier to that used in Example 3 was immersed in 3.0 liters of an aqueous palladium nitrate, nickel nitrate, barium nitrate, strontium nitrate, zirconyl nitrate and aluminum nitrate solution in which the concentrations of palladium ions, nickel ions, barium ions, strontium ions, zirconium ions and aluminium ions were 0.036 moles, 1.5 moles, 0.073 moles, 0.073 1.50 0.073 moles and 0.073 moles, respectively, per liter of the solution.

The resultant alumina-coated monolithic catalyst contained in the block 0.010 moles of palladium, 0.40 moles of nickel, 0.02 moles of barium, 0.02 moles of strontium, 0.02 moles of zirconium and 0.02 moles of aluminum, when calculated as metals, all in the form of oxides.

EXAMPLE 50

Example 1 was repeated except that a block of a similar monolithic carrier to that used in Example 1 was immersed in 3.0 liters of an aqueous palladium nitrate, nickel nitrate, barium nitrate, magnesium nitrate, bismuth nitrate and vanadium trioxide solution in which the concentrations of palladium ions, nickel ions, barium ions, magnesium ions, bismuth ions and vanadium ions were 0.077 moles, 1.90 moles, 0.10 moles, 0.10 moles, 0.10 moles and 0.10 moles, respectively per liter of the solution.

The resultant monolithic catalyst contained in the block 0.015 moles of palladium, 0.30 moles of nickel, 0.02 moles of barium, 0.02 moles of magnesium, 0.02 moles of bismuth and 0.02 moles of vanadium, when calculated as metals, all in the form of oxides.

EXAMPLE 51

Alkali-free hydroxides in the form of dried powder prepared by a precipitation method, viz., 0.20 moles of nickel hydroxide, 0.005 moles of barium hydroxide and 0.005 moles of zirconium hydroxide, and 1 liter of an activated alumina powder of about 200–250 mesh per inch were mixed well in a mortar. 0.5 liters of alumina sol containing 10% by weight of alumina and water were further added to the mixture to give it a suitable consistency. The resultant mixture was moulded in a compression type tableting machine into 3 × 3 mm tablets. The thus obtained tablets were dried at 120°C for 15 hours and then immersed in 1 liter of an aqueous solution containing 0.01 moles of palladium nitrate. The immersed tablets were removed from the solution, dried at 120°C for 15 hours and sintered in a stream of air at 700°C for 8 hours to obtain a tableted catalyst having catalytic components composed of oxides of nickel, barium, zirconium and palladium.

EXAMPLE 52

Alkali-free hydroxides in the form of dried powder prepared by a precipitation method, viz., 0.40 moles of nickel hydroxide, 0.01 moles strontium hydroxide, 0.01 moles of bismuth hydroxide and 0.015 moles of palladium hydroxide, were mixed together in a mortar. 1 liter of an activated alumina of 200–250 mesh per inch and 0.5 liters of alumina sol containing 10% by weight of alumina were added to the mixture and water was further added to the mixture to give a suitable consistency thereto. Thereafter, the resultant mixture was moulded in a compression type tableting machine into 3 × 3 mm tablets. The thus obtained tablets were then dried at 120°C for 15 hours and sintered in a stream of air at 700°C for 8 hours to give a tableted catalyst having catalytic components composed of oxides of nickel, strontium, bismuth and palladium.

EXAMPLE 53

Alkali-free hydroxides in the form of dried powder prepared by a precipitation method, viz., 0.80 moles of nickel hydroxide, 0.05 moles of barium hydroxide, 0.01 moles of magnesium hydroxide and 0.02 moles of zirconium hydroxide, and 1 liter of powder of an activated alumina of 200–250 mesh per inch were mixed well in a mortar. 0.5 liters of alumina sol containing 10% by weight of alumina were added to the mixture and water was further added to the mixture to give a suitable consistency thereto. The resultant mixture was moulded in a compression type tableting machine into tablets. The thus obtained tablets were dried at 120°C for 15 hours and immersed in 1 liter of an aqueous solution containing 0.02 moles of palladium nitrate. The immersed tablets were removed from the solution, dried at 120°C for 15 hours and sintered in a stream of air at 700°C for 8 hours to give a tableted catalyst having catalytic components composed of oxides of nickel, barium, magnesium, zirconium and palladium.

EXAMPLE 54

Alkali-free hydroxides in the form of dried powder prepared by a precipitation method, viz., 1.20 moles of nickel hydroxide, 0.02 moles of magnesium hydroxide, 0.07 moles of zirconium hydroxide, 0.02 moles of bismuth hydroxide and 0.015 moles of palladium hydroxide, were mixed together in a mortar. 1 liter of an activated alumina powder of 200–250 mesh per inch and 0.5 liters of alumina sol containing 10% by weight of alumina were added to the mixture and water was further added to the mixture to give a suitable consistency thereto. The resultant mixture was moulded in a compression type tableting machine into 3 × 3 mm tablets. The thus obtained tablets was dried at 120°C for 15 hours and sintered in a stream of air at 700°C for 8 hours to give a tableted catalyst having catalytic components composed of oxides of nickel, magnesium, zirconium, bismuth and palladium.

EXAMPLE 55

Alkali-free hydroxides in the form of powder prepared by a precipitation method, viz., 1.50 moles of nickel hydroxide, 0.03 moles of strontium hydroxide, 0.03 moles of magnesium hydroxide, 0.02 moles of vanadium hydroxide and 0.02 moles of bismuth hydroxide, and 1 liter of an activated alumina powder of 200–250 mesh per inch were mixed together in a mortar. To the mixture were added 0.5 liters of alumina sol containing 10% by weight of alumina and water was further added to the mixture to give a suitable consistency thereto. Thereafter, the resultant mixture was moulded in a compression type tableting machine into 3 × 3 mm tablets. The thus obtained tablets were dried at 120°C for 15 hours and then immersed in 1 liter of an aqueous solution containing 0.02 moles of palladium nitrate. The immersed tablets were then removed from the solution, dried at 120°C for 15 hours and sintered in a stream of air at 700°C for 8 hours to give a tableted catalyst having catalytic components composed of oxides of nickel, strontium, magnesium, vanadium, bismuth and palladium.

Twelve different comparative examples were prepared for comparison with the catalysts prepared in accordance with the present invention as described in the above examples.

COMPARATIVE EXAMPLE 1

1 liter of a carrier of a commercially available activated chi-alumina of about 6–8 mesh per inch was immersed in 1.50 liters of an aqueous copper nitrate and chromium nitrate solution wherein the concentrations of copper ions and chromium ions were 1.0 mole and 2.0 moles, respectively, per liter of the solution. The thus immersed carrier was removed from the solution, dried at 120°C for 15 hours and sintered in a stream of air at 750°C for 15 hours. The resultant catalyst contained metal oxides in which 0.5 moles of copper and 1.0 mole of chromium were present, when calculated as metals per liter of the catalyst.

COMPARATIVE EXAMPLE 2

Comparative Example 1 was repeated except that 1 liter of a similar activated alumina carrier to that used in Comparative Example 1 was immersed in 1.50 liters of an aqueous copper nitrate, chromium nitrate and palladium nitrate solution in which the concentrations of copper ions, chromium ions and palladium ions were 1.0 mole, 2.0 moles and 0.02 moles, respectively, per liter of the solution.

The resultant catalyst contained in the form of oxides 0.5 moles of copper, 1.0 mole of chromium and 0.01 moles of palladium, when calculated as metals, in 1 liter of the catalyst.

COMPARATIVE EXAMPLE 3

Comparative Example 1 was repeated except that 1.0 liter of a similar activated alumina carrier to that used in Comparative Example 1 was immersed in 1.5 liters of an aqueous nickel nitrate and chromium nitrate solution in which the concentrations of nickel ions and chromium ions were 1.5 moles and 1.5 moles, respectively, per liter of the solution.

The resultant catalyst contained in the form of oxides 0.75 moles of nickel and 0.75 moles of chromium, when calculated as metals, in 1 liter of the catalyst.

COMPARATIVE EXAMPLE 4

Comparative Example 1 was repeated except that 1 liter of an activated alumina carrier similar to that used in Comparative Example 1 was immersed in 1.5 liters of an aqueous manganese nitrate, chromium nitrate and copper nitrate solution in which the concentrations of manganese ions, chromium ions and copper ions were 1.0 mole, 2.0 moles and 1.0 mole, respectively, per liter of the solution.

The resultant catalyst contained in the form of oxides 0.5 moles of manganese, 1.0 mole of chromium and 0.5 moles of copper, when calculated as metals, in 1 liter of the catalyst.

COMPARATIVE EXAMPLE 5

Comparative Example 1 was repeated except that 1 liter of an activated alumina carrier similar to that used in Example 1 was immersed in 1.50 liters of an aqueous palladium nitrate solution in which the concentration of palladium ions was 0.020 moles in 1 liter of the solution.

The resultant catalyst contained in the oxide form 0.010 moles of palladium, when calculated as metal, per liter of the catalyst.

COMPARATIVE EXAMPLE 6

A block of a 0.785 liter cordierite monolithic carrier was immersed in 3.0 liters of an aqueous palladium nitrate solution in which the concentration of palladium ions was 0.12 moles per liter of the solution. The thus immersed carrier was then removed from the solution, dried at 120°C for 15 hours and sintered in a stream of air at 800°C for 4 hours.

The resultant monolithic catalyst contained in the block 0.022 moles of palladium, when calculated as metal in oxide form.

COMPARATIVE EXAMPLE 7

A block of a similar monolithic carrier to that used in Comparative Example 6 was immersed in a commercially available gamma-alumina sol and then sintered at 700°C for 3 hours to deposit gamma-alumina thereon. The same process was further repeated two times so that a total of 21% by weight of gamma-alumina was finally deposited on the monolithic carrier.

The thus obtained alumina-coated monolithic carrier was immersed in 3.0 liters of an aqueous palladium nitrate solution in which 0.036 moles of palladium ions were present in 1 liter of the solution. The thus immersed carrier was removed from the solution, dried at 120°C for 15 hours and sintered in a stream of air at 750°C for 6 hours. The resultant monolithic catalyst contained in the block 0.010 moles of palladium, when calculated as metals, in oxide form.

COMPARATIVE EXAMPLE 8

Comparative Example 1 was repeated except that 1 liter of a similar activated alumina carrier to that used in Comparative Example 1 was immersed in 1.5 liters of an aqueous palladium nitrate and nickel nitrate solution in which the concentrations of palladium ions and nickel ions were 0.020 moles and 6.20 moles, respectively, per liter of the solution.

The resultant catalyst contained in the form of oxides 0.010 moles of palladium and 3.1 moles of nickel, when calculated as metals, per liter of the catalyst.

COMPARATIVE EXAMPLE 9

Comparative Example 1 was repeated except that 1 liter of a similar activated alumina carrier to that used in Comparative Example 1 was immersed in 1.50 liters of an aqueous palladium nitrate and nickel nitrate solution in which the concentrations of palladium ions and nickel ions were 0.020 moles and 0.06 moles, respectively, per liter of the solution.

The resultant catalyst contained in the form of oxides 0.010 moles of palladium and 0.03 moles of nickel, when calculated as metals, per liter of the catalyst.

COMPARATIVE EXAMPLE 10

Comparative Example 1 was repeated except that 1 liter of a similar activated alumina carrier to that used in Comparative Example 1 was immersed in 1.50 liters of an aqueous palladium nitrate and nickel nitrate solution wherein the concentrations of palladium ions and nickel ions were 0.0004 moles and 2.0 moles, respectively.

The resultant catalyst contained in the form of oxides 0.0002 moles of palladium and 1.0 mole of nickel, when calculated as metals, per liter of the catalyst.

COMPARATIVE EXAMPLE 11

Comparative Example 7 was repeated except that a similar block of monolithic carrier to that used in Comparative Example 7 was immersed in 3.0 liters of an aqueous palladium nitrate, nickel nitrate and strontium nitrate solution in which the concentrations of palladium ions, nickel ions and strontium ions were 0.042 moles, 1.70 moles and 1.28 moles, respectively, per liter of the solution.

The resultant monolithic catalyst contained in the block 0.010 moles of palladium, 0.40 moles of nickel and 0.30 moles of strontium, when calculated as metals, all in the form of oxides in 0.785 liters of the catalyst.

COMPARATIVE EXAMPLE 12

Comparative Example 7 was repeated except that a similar block of a monolithic carrier to that in Comparative Example 7 was immersed in 3.0 liters of an aqueous palladium nitrate, nickel nitrate and strontium nitrate solution in which the concentrations of palladium ions, nickel ions and strontium ions were 0.042 moles, 1.70 moles and 0.021 moles, respectively, per liter of the solution.

The resultant monolithic catalyst contained in the block 0.010 moles of palladium, 0.40 moles of nickel and 0.005 moles of strontium, when calculated as metals, in the form of oxides.

Activity tests for catalysts which were obtained by Comparative Examples 1 to 12 and by Examples 1 to 55 were conducted in the following manner. Gases A and B having compositions indicated in Table 1 below were used as models in the tests, wherein the model gas A was used for oxidizing reactions while the model gas B for reducing reactions. The oxidizing and reducing reactions were performed at a space velosity of 15000 hr$^{-1}$. The temperature of the catalyst bed was varied in a range of from 100° to 600°C so that a general relation between the temperature (°C) and the conversion of carbon monoxide, propane and nitrogen monoxide was determined. The conversion mentioned above is intended to mean a proportion in percentage of the carbon monoxide, propane or nitrogen monoxide converted into non-toxic compounds such as carbon dioxide and nitrogen.

TABLE I

| Constituents | | Model gas A | Model gas B |
|---|---|---|---|
| Carbon monoxide, | % by volume | 2.0 | 2.0 |
| Propane, | ppm | 500 | 500 |
| Nitrogen monoxide, | ppm | 1000 | 1000 |
| Carbon dioxide, | % by volume | 12.0 | 12.0 |
| Oxygen, | % by volume | 2.5 | 0 |
| Water vapor, | % by volume | 5.0 | 5.0 |
| Nitrogen | | balance | balance |

The relationship between conversion efficiency and temperature thus determined is, for example, illustrated by the plot in the FIGURE of the accompanying drawing.

Temperatures at which the conversions of carbon monoxide, propane and nitrogen monoxide reached 90% were obtained from the relation indicated by the curve.

These temperatures were used for comparison in particular respect to activity between the catalysts of the present invention and the catalysts described in Comparative Examples 1 to 12. It is, in this instance, apparent that the lower the temperature providing the conversion of 90%, the higher is the low-temperature activity of the catalyst and vice versa. Thus, the objectives of the present invention will be better accomplished when catalysts exhibit the 90% conversion at lower temperatures.

Tests were further conducted to evaluate the durabilities of the catalysts prepared in Examples 1 to 55 and Comparative Examples 1 to 12. For this purpose, the catalysts to be tested were positioned in a front muffler of an exhaust system of automotive 4-cycle, 4-cylinder internal combustion engine having a 1600 cc displacement. An output shaft of the engine was connected to a widely used dynamometer to load the engine. The engine was powered by leadless gasoline and cyclically driven through modes of operation including acceleration, normal cruising, deceleration and idling under the conditions analogous to the durability test standards established by AMA (Automobile Manufacturers' Association, United States of America). Secondary air was introduced into the exhaust system upstream of the catalyst where the catalyst was used for oxidation while, in the tests in which the catalyst was used for reduction, secondary air was not supplied to the exhaust system.

The catalysts which had undergone tests in which the engine was driven to simulate 5000 km driving of a motor vehicle were tested for activity with use of the model gases A and B, whereby temperatures providing 90% conversion of the catalysts were determined. The difference between the 90% conversion achieved by the catalysts before and after the durability tests is considered to provide a useful criterion for the evaluation of the durability of the catalyst. Thus, the smaller such difference, the higher the durability of the catalyst will be. The results of the tests above mentioned are shown in Table 2.

TABLE 2

| Catalysts | | 90% Conversion Temperature °C | | | | | |
|---|---|---|---|---|---|---|---|
| | | Before Test | | | After Test | | |
| | | CO* | C$_3$H$_x$* | NO** | CO* | C$_3$H$_x$* | NO** |
| Example | 1 | 400 | 430 | 440 | 445 | 470 | 520 |
| " | 2 | 400 | 430 | 450 | 450 | 495 | 525 |
| " | 3 | 380 | 420 | 440 | 420 | 470 | 500 |
| " | 4 | 380 | 425 | 440 | 425 | 480 | 500 |
| " | 5 | 370 | 410 | 430 | 410 | 450 | 500 |
| " | 6 | 365 | 410 | 430 | 400 | 455 | 490 |
| " | 7 | 360 | 415 | 420 | 405 | 440 | 490 |
| " | 8 | 370 | 410 | 440 | 410 | 470 | 500 |
| " | 9 | 370 | 400 | 430 | 410 | 465 | 515 |
| " | 10 | 350 | 400 | 420 | 385 | 445 | 480 |
| Example | 11 | 340 | 390 | 410 | 380 | 435 | 465 |
| " | 12 | 350 | 395 | 410 | 380 | 440 | 460 |
| " | 13 | 345 | 390 | 410 | 375 | 440 | 460 |
| " | 14 | 340 | 380 | 400 | 370 | 420 | 450 |
| " | 15 | 320 | 365 | 410 | 350 | 395 | 460 |
| " | 16 | 340 | 385 | 410 | 380 | 425 | 460 |
| " | 17 | 320 | 360 | 400 | 365 | 400 | 455 |
| " | 18 | 335 | 380 | 405 | 370 | 420 | 450 |
| " | 19 | 330 | 370 | 410 | 370 | 410 | 460 |
| " | 20 | 340 | 375 | 400 | 380 | 410 | 450 |
| " | 21 | 340 | 380 | 390 | 375 | 415 | 440 |
| " | 22 | 340 | 385 | 400 | 385 | 420 | 455 |
| " | 23 | 340 | 380 | 400 | 380 | 415 | 445 |
| " | 24 | 330 | 380 | 380 | 370 | 420 | 430 |
| " | 25 | 370 | 410 | 440 | 400 | 440 | 470 |
| " | 26 | 370 | 410 | 440 | 390 | 430 | 460 |
| " | 27 | 370 | 415 | 445 | 390 | 450 | 480 |
| " | 28 | 370 | 415 | 450 | 390 | 450 | 490 |
| " | 29 | 360 | 410 | 450 | 390 | 440 | 490 |
| " | 30 | 370 | 415 | 450 | 395 | 440 | 485 |
| Example | 31 | 365 | 410 | 445 | 380 | 435 | 480 |
| " | 32 | 365 | 410 | 450 | 375 | 430 | 475 |
| " | 33 | 370 | 420 | 450 | 395 | 450 | 495 |
| " | 34 | 365 | 415 | 450 | 385 | 440 | 490 |
| " | 35 | 370 | 415 | 445 | 395 | 445 | 490 |
| " | 36 | 370 | 410 | 450 | 390 | 440 | 490 |
| " | 37 | 370 | 410 | 440 | 385 | 430 | 470 |
| " | 38 | 330 | 360 | 400 | 350 | 390 | 430 |
| " | 39 | 320 | 370 | 415 | 340 | 390 | 440 |
| " | 40 | 330 | 360 | 410 | 350 | 375 | 440 |
| " | 41 | 320 | 355 | 405 | 340 | 380 | 435 |
| " | 42 | 330 | 360 | 410 | 350 | 380 | 440 |
| " | 43 | 330 | 370 | 400 | 345 | 385 | 435 |
| " | 44 | 320 | 365 | 405 | 340 | 380 | 430 |
| " | 45 | 320 | 360 | 410 | 335 | 385 | 440 |
| " | 46 | 335 | 375 | 405 | 340 | 390 | 440 |
| " | 47 | 330 | 370 | 400 | 340 | 390 | 430 |
| " | 48 | 330 | 370 | 390 | 340 | 390 | 420 |
| " | 49 | 330 | 375 | 415 | 345 | 390 | 440 |
| " | 50 | 330 | 370 | 405 | 345 | 385 | 440 |
| Example | 51 | 320 | 360 | 415 | 340 | 380 | 440 |
| " | 52 | 325 | 365 | 415 | 335 | 380 | 450 |
| " | 53 | 330 | 370 | 410 | 345 | 390 | 440 |
| " | 54 | 320 | 360 | 410 | 335 | 380 | 445 |
| " | 55 | 320 | 360 | 405 | 340 | 385 | 440 |
| Comparative Example | 1 | 420 | 480 | 480 | 500 | 570 | 570 |
| " | 2 | 410 | 460 | 480 | 480 | 550 | 580 |
| " | 3 | 440 | 510 | 460 | 500 | 580 | 560 |
| " | 4 | 410 | 450 | 480 | 490 | 540 | 600 |

TABLE 2-continued

| Catalysts | | 90% Conversion Temperature °C | | | | | |
|---|---|---|---|---|---|---|---|
| | | Before Test | | | After Test | | |
| | | CO* | C₃Hₙ* | NO** | CO* | C₃Hₙ* | NO** |
| " | 5 | 420 | 470 | 520 | 490 | 560 | over 600 |
| " | 6 | 430 | 480 | 540 | 505 | 580 | " |
| " | 7 | 420 | 480 | 530 | 490 | 570 | " |
| " | 8 | 420 | 470 | 480 | 490 | 570 | 580 |
| " | 9 | 410 | 490 | 530 | 480 | 595 | over 600 |
| " | 10 | 460 | 480 | 500 | 540 | 560 | 575 |
| " | 11 | 390 | 470 | 480 | 450 | 550 | 560 |
| " | 12 | 365 | 430 | 465 | 440 | 520 | 550 |

Note:
The signs "*" and "**" indicate tests using the model gases A and B, respectively.

What is claimed is:

1. A method of preparing a catalyst for use in treatment of exhaust gases containing carbon monoxide, hydrocarbons and nitrogen oxides, said method comprising the steps of: mixing together nickel hydroxide in powder form, activated alumina in powder form and alumina sol; moulding the mixture into a suitable form; immersing the mould in a solution of a palladium salt selected from the group consisting of palladium nitrate, palladium bromide, palladium chloride, palladium sulfate; sintering the resultant mould at a temperature of 700° to 800°C to give a catalyst containing nickel oxide and palladium oxide, the nickel being contained in an amount of from 0.05 to 3.0 moles and the palladium in an amount of from 0.0003 to 0.1 moles, when calculated as metals, per liter of carrier components, both in oxide form.

2. A method as claimed in claim 1, wherein said mixed powders further includes at least one hydroxide of barium, magnesium, strontium, zirconium, bismuth and vanadium, said at least one hydroxide being sintered to be converted into the oxide, the metal component of said oxide having a molar ratio ranging from 1/50 to ½ of said nickel.

3. A method of preparing a catalyst for use in treatment of exhaust gases containing carbon monoxide, hydrocarbons and nitrogen oxides, said method comprising the steps of: mixing together in powdered form nickel hydroxide, palladium hydroxide and activated alumina, and alumina sol; moulding the resultant mixture into a suitable form; and sintering the mould at a temperature of a suitable form; and sintering the mould at a temperature of 600° to 900° to give a catalyst containing nickel oxide and palladium oxide, the palladium being contained in an amount of from 0.0003 to 0.1 moles and the nickel in amount of from 0.05 to 3.0 moles, when calculated as metals, per liter of carrier components, both in oxide form.

4. A method as claimed in claim 3, wherein said powder further includes at least one of barium, magnesium, strontium, zirconium, bismuth and vanadium hydroxides, said at least one hydroxide being sintered to be converted into oxide of which metal component has a molar ratio ranging from 1/50 to ½ of said nickel.

* * * * *